(12) United States Patent
Kaima

(10) Patent No.: US 7,551,192 B2
(45) Date of Patent: Jun. 23, 2009

(54) OPTICAL-BEAM SCANNING APPARATUS AND IMAGE FORMING APPARATUS

(75) Inventor: Nobuyoshi Kaima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 216 days.

(21) Appl. No.: 11/332,207

(22) Filed: Jan. 17, 2006

(65) Prior Publication Data

US 2006/0164661 A1    Jul. 27, 2006

(30) Foreign Application Priority Data

Jan. 21, 2005    (JP) .............................. 2005-014547

(51) Int. Cl.
- *B41J 2/47* (2006.01)
- *B41J 2/435* (2006.01)
- *G03G 15/01* (2006.01)
- *G06K 15/02* (2006.01)

(52) U.S. Cl. .................. 347/235; 347/246; 347/250; 399/301; 358/1.2

(58) Field of Classification Search ................. 347/235, 347/246, 250; 399/301; 358/1.2
See application file for complete search history.

(56) References Cited

U.S. PATENT DOCUMENTS

| | | | |
|---|---|---|---|
| 5,627,649 A * | 5/1997 | Sawayama et al. .......... | 358/296 |
| 6,791,596 B2 * | 9/2004 | Nihei et al. .................. | 347/247 |
| 6,833,856 B2 * | 12/2004 | Maeda ........................ | 347/248 |
| 2001/0019417 A1 * | 9/2001 | Ueki ........................... | 358/1.9 |
| 2002/0101502 A1 * | 8/2002 | Suganuma ................... | 347/248 |

FOREIGN PATENT DOCUMENTS

| | | |
|---|---|---|
| JP | 9-58053 | 3/1997 |
| JP | 2003-279873 | 10/2003 |

* cited by examiner

*Primary Examiner*—Stephen D Meier
*Assistant Examiner*—Sarah Al-Hashimi
(74) *Attorney, Agent, or Firm*—Oblon, Spivak, McClelland, Maier & Neustadt, P.C.

(57) ABSTRACT

A scanning time is divided by the number of sides of a polygon mirror to obtain a value N. Then, it is determined whether an error has occurred. When no error has occurred, the value N is stored in an NVRAM, and a magnification correction value is calculated. Values M and N of a PLL are set based on the correction value. A difference between a clock set by the PLL and an ideal pixel clock frequency is corrected to an optimal magnification by changing a phase. The ideal pixel clock frequency after magnification correction is calculated from $V=N0/N\times F$. The values M and N of the PLL that provide a frequency closest to the ideal frequency V are acquired. A difference between a frequency V' acquired from the values M and N and the ideal pixel clock frequency V is corrected by the clock phase.

7 Claims, 9 Drawing Sheets

FIG.8

| No. | TARGET FREQUENCY [MHz] | VALUE M (D) PLL SETTING | VALUE N (D) | VALUE H (D) PHASE SHIFT SETTING |
|---|---|---|---|---|
| 0 | A | 18 | 503 | -8 |
| 1 | B | 19 | 531 | 7 |
| 2 | C | 19 | 531 | -1 |
| 3 | D | 19 | 531 | -9 |
| 4 | E | 20 | 559 | 4 |
| 5 | F | 20 | 559 | -4 |
| 6 | G | 21 | 587 | 7 |
| 7 | H | 21 | 587 | -1 |
| 8 | I | 22 | 615 | 9 |
| 9 | J | 22 | 615 | 1 |
| 10 | K | 22 | 615 | -8 |
| 11 | L | 23 | 643 | 0 |
| 12 | M | 24 | 671 | 7 |
| 13 | N | 24 | 671 | -1 |
| 14 | O | 25 | 699 | 4 |
| 15 | P | 25 | 699 | -4 |
| 16 | Q | 25 | 699 | -12 |
| 17 | R | 25 | 699 | -20 |
| 18 | S | 25 | 699 | -28 |
| 19 | T | 25 | 699 | -36 |
| 20 | U | 25 | 699 | -45 |

OPTICAL-BEAM SCANNING APPARATUS AND IMAGE FORMING APPARATUS

CROSS-REFERENCE TO RELATED APPLICATIONS

The present document incorporates by reference the entire contents of Japanese priority document, 2005-014547 filed in Japan on Jan. 21, 2005.

BACKGROUND OF THE INVENTION

1. Field of the Invention

The present invention relates to an optical-beam scanning apparatus and an image forming apparatus that has a function of an image magnification control.

2. Description of the Related Art

A technology of an image magnification control is disclosed in, for example, Japanese Patent Application Laid-open No. 2003-279873.

An optical-beam scanning apparatus in the above technology can correct dot positions with high precision. According to the optical scanning apparatus, two detectors respectively detect a start position and an end position of write effective region for a scanning laser beam. The detected positions are input to a dot-position deviation detector/controller. The dot-position deviation detector/controller measures time spent for the laser beam to scan between positions of the detectors to obtain a scanning time, and compares measured scanning time with a scanning time when ideal scanning has been performed. Thus, a deviation in the scanning time is obtained. Based on the deviation, phase data is corrected. The optical-beam scanning apparatus shifts the phase of a clock to correct magnification. Correction of magnification is commonly executed with a clock frequency of a phase locked loop (PLL).

If the correction is executed only by a PLL, however, to achieve accurate correction, the PLL needs to have a high accuracy. This results in a large circuit scale and a cost increase. If the correction is executed only by phase shifting, the phase is partially shifted. This results in deterioration of an image quality.

SUMMARY OF THE INVENTION

It is an object of the present invention to at least solve the above problems in the conventional technology.

An optical beam scanning apparatus according to one aspect of the present invention includes a light source configured to emit an optical beam; a control unit configured to control the light source to emit the optical beam according to image data; a deflecting unit configured to deflect the optical beam in a main scanning direction; a detecting unit configured to detect deflected optical beam on a main scanning line; a first correcting unit configured to correct a main scanning magnification; and a second correcting unit configured to correct the main scanning magnification. The main scanning magnification is corrected by a combination of correction by the first correcting unit and correction by the second correcting unit.

An image forming apparatus according to another aspect of the present invention includes an optical beam scanning apparatus according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 is a table of magnification correction values; and

DETAILED DESCRIPTION OF THE PREFERRED EMBODIMENTS

Exemplary embodiments of the present invention are explained in detail below with reference to the accompanying drawings.

Figure 1:
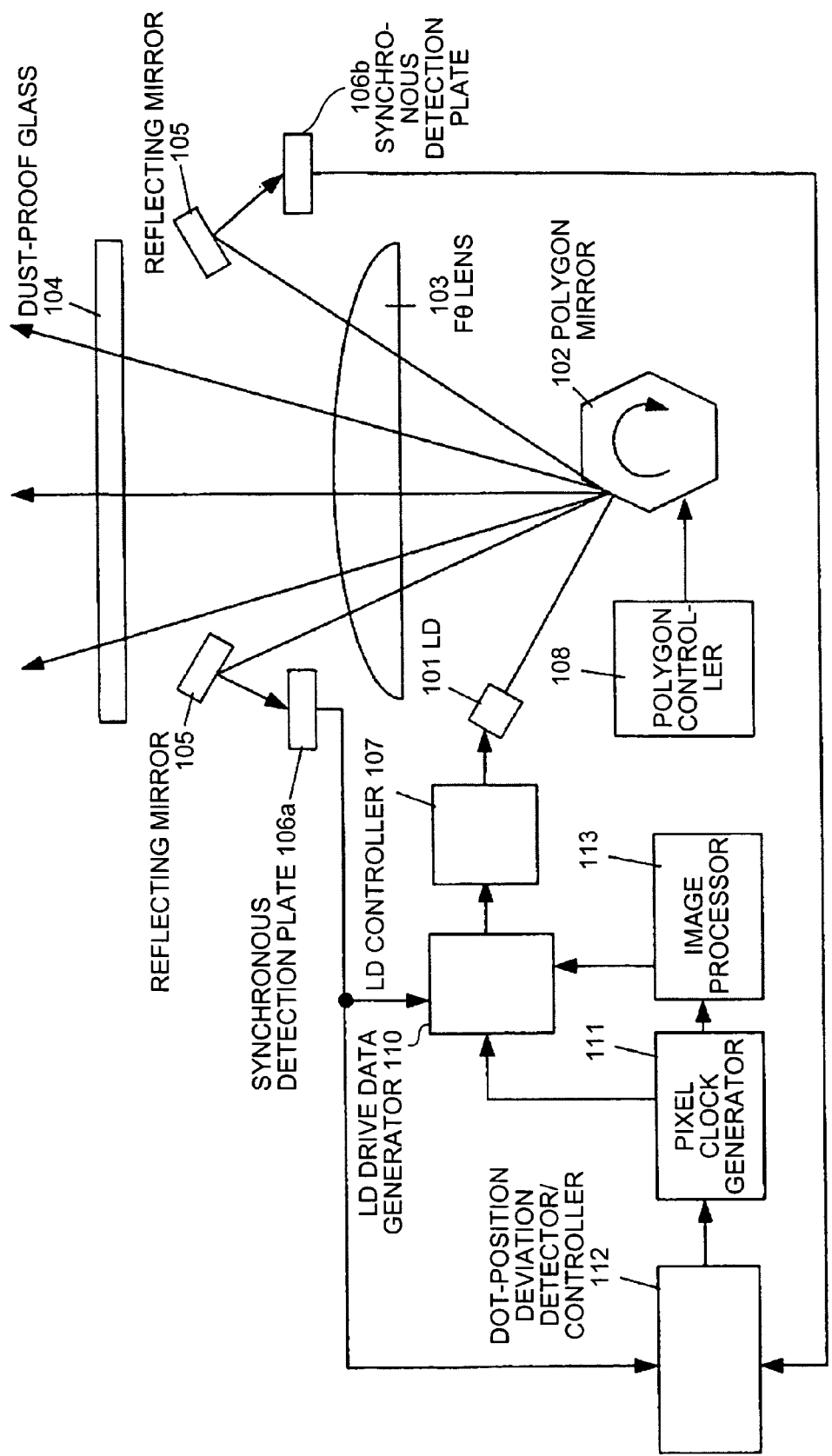
FIG. 1 is a schematic of a write controller and a writing unit of an optical scanning apparatus according to one embodiment of the present invention.

FIG. 1 is a schematic of a write controller and a writing unit of an optical scanning apparatus according to one embodiment of the present invention. The optical scanning apparatus includes the write controller and the writing unit. The write controller includes a semiconductor laser (laser diode, hereinafter, "LD") controller 107, a polygon controller 108, an LD drive data generator 110, a pixel clock generator 111, a dot-position deviation detector/controller 112, and an image processor 113. The writing unit includes an LD 101, a polygon mirror 102, an fθ lens 103, a dust-proof glass 104, a reflecting mirror 105, and two synchronous detection plates (synchronous detection sensors) 106a and 106b.

In the writing unit, a laser beam from the LD 101 is scanned with the polygon mirror 102, and passes through the fθ lens 103. The laser beam is output to a photoconductor (not shown) through the dust-proof glass 104. The polygon controller 108 controls the rotation of the polygon mirror 102. The synchronous detection plates 106a and 106b are respectively provided at a start position of a write effective region and an end position of the write effective region for the scanning laser beam that are detected when the laser beam passes the synchronous detection plates 106a and 106b. The detection signals are input to the dot-position deviation detector/controller 112.

The dot-position deviation detector/controller 112 measures a scanning time that is time required for the laser beam to scan between the synchronous detection plates 106a and 106b. The dot-position deviation detector/controller 112 then compares measured scanning time with a scanning time when ideal scanning is performed, obtaining the deviation of the scanning time. The dot-position deviation detector/controller 112 generates phase data for correcting the deviation, and outputs the phase data to the pixel clock generator 111. Based on the PLL that generates a clock and the phase data, the pixel clock generator 111 performs phase shifting to change the phase of the clock generated by the PLL.

The clock can be set by setting values N and M in F=CLKref×N/M. A reference frequency CLKref is input from a crystal oscillator.

Figure 9:
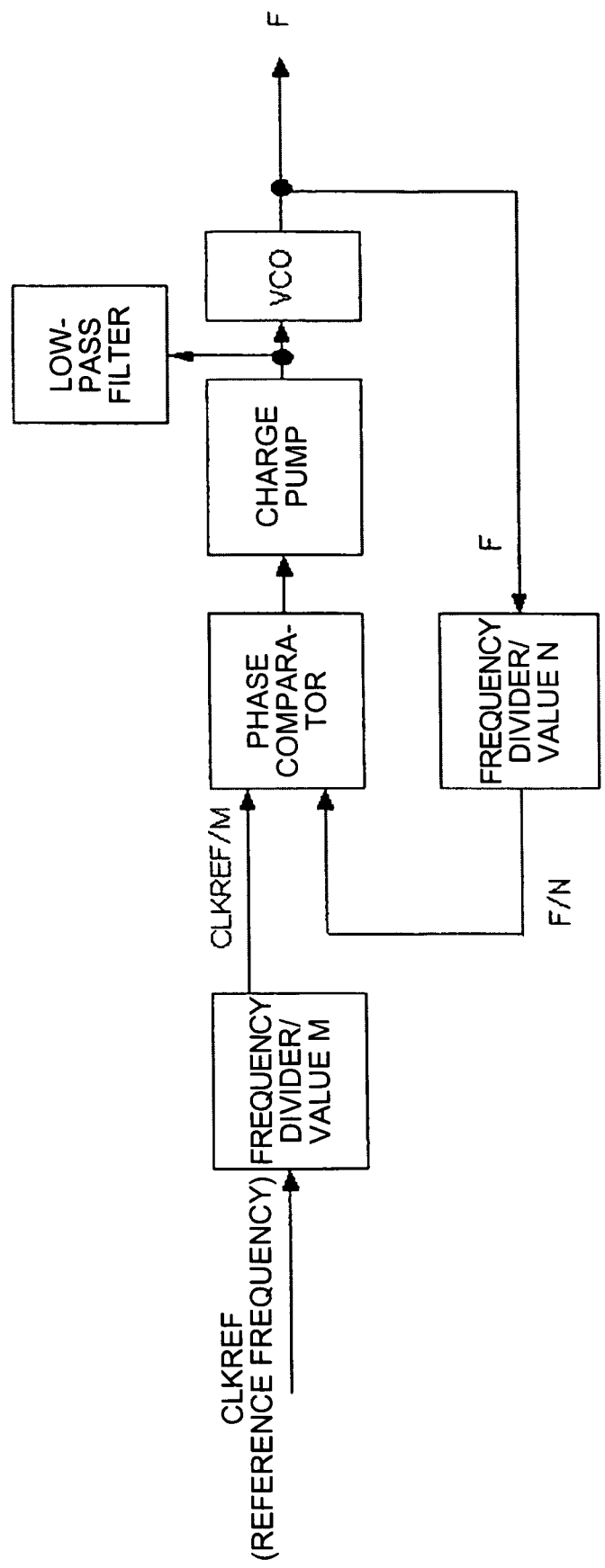
FIG. 9 is a schematic of a PLL circuit.

FIG. 9 is an example of a PLL circuit. In the PLL circuit, a phase comparator compares a clock CLKref/M, acquired by dividing the reference clock CLKref by a frequency dividing ratio M, with a clock F/N frequency-divided by a feedback frequency divider. The output differs depending on which one of the phases of two input clocks leads. When the phase of fin/R leads, a charge pump outputs a pulse in a positive direction with respect to the reference voltage. When the phase of F/N leads, the charge pump outputs a pulse in a negative direction.

The output that has this pulse is integrated by a low-pass filter (LPF), and is input to a voltage controlled oscillator (VCO). The VCO changes its output frequency according to the input voltage. When the phase of CLKref/M leads, i.e., when the pulse is output in the positive direction, therefore, a voltage higher than the reference voltage is input from the LPF. This increases the output frequency. When the pulse is output in the negative direction, the output frequency decreases. This operation causes the phase of CLKref/M to match with the phase of F/N.

Accordingly, the equation representing the output frequency F as the output frequency is acquired. It is understood that the output frequency can be varied arbitrarily (actually to a discrete value) by setting N and M.

When the pixel clock generator 111 does not have a phase data memory circuit, the dot-position deviation detector/controller 112 outputs phase data to the pixel clock generator 111 line by line. When the pixel clock generator 111 has a phase data memory circuit, on the other hand, phase data is acquired beforehand and is given to the pixel clock generator 111 in advance. The dot-position deviation detector/controller 112 generates not only phase data (first phase data) for always making the same correction line by line as in, for example, correcting nonuniform scanning caused by the characteristic of the scanning lens, but also phase data (second phase data) adapted for correction that changes line by line as in, for example, correcting irregular rotation of the polygon mirror 102. When the pixel clock generator 111 has a phase data synthetic circuit, the dot-position deviation detector/controller 112 outputs the first and the second phase data to the pixel clock generator 111.

The pixel clock generator 111 generates a pixel clock based on the phase data from the dot-position deviation detector/controller 112, and supplies the pixel clock to the image processor 113 and the LD drive data generator 110. The image processor 113 generates image data based on the pixel clock. The LD drive data generator 110 receives the image data, generates LD drive data (modulation data) likewise based on the pixel clock, and drives the LD 101 via the LD controller 107.

Since the technology of shifting the phase of the pixel clock generator 111 based on phase data and the technology of changing a dot position to an arbitrary position are publicly known and described in Japanese Patent Application Laid-open No. 2003-279873, details of the technology are not explained herein. Furthermore, since the technology of measuring a difference in time over which scanning with a laser beam takes place is publicly known as disclosed in, for example, Japanese Patent Application Laid-open No. H9-58053, its details are not explained herein.

Figure 2:
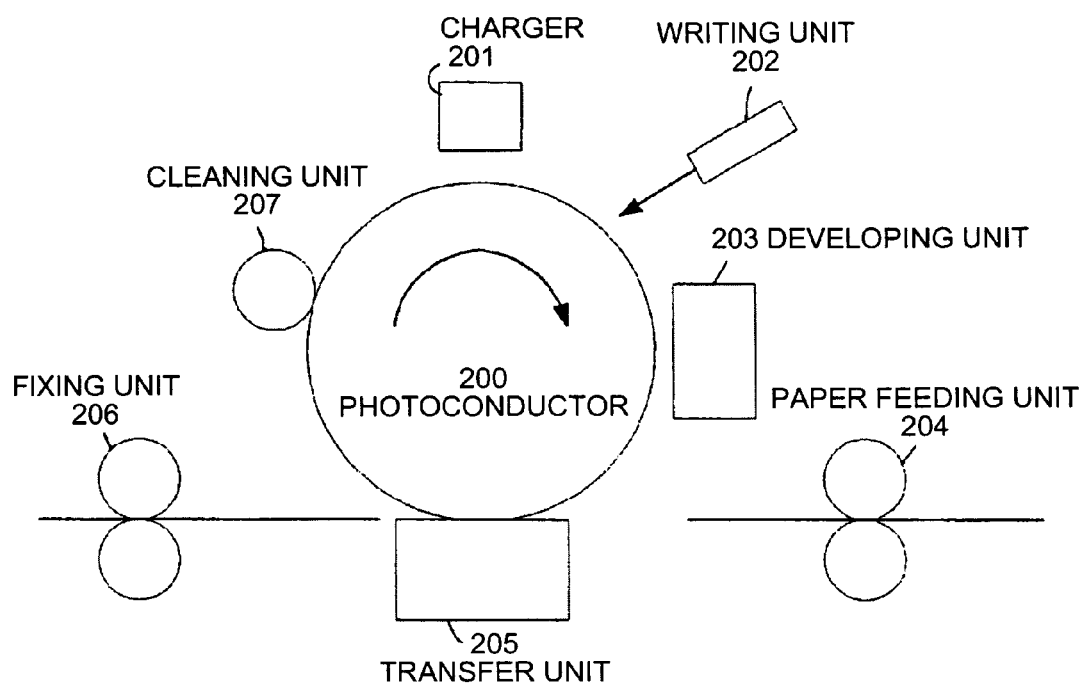
FIG. 2 a schematic of an imaging unit in an image forming apparatus.

FIG. 2 is a schematic of an imaging unit in an image forming apparatus. The imaging unit has, around a photoconductor 200, a charger 201, a writing unit 202, a developing unit 203, a transfer unit 205, a cleaning unit 207, a de-electrifier (not shown), and the like. The imaging unit also includes a paper feeding unit 204 that feeds paper to the transfer unit 205, and a fixing unit 206 that fixes a toner image transferred on a transfer paper. In the imaging unit including the image forming components, the surface of the photoconductor 200 is charged positive by the charger 201, and the photoconductor 200 is exposed to the light beam from the LD 101 shown in FIG. 1 by the writing unit 202, thereby forming an electrostatic latent image on the surface of the photoconductor 200. The developing unit 203 puts toner onto the electrostatic latent image on the photoconductor 200, and obtains a visible toner image. The transfer unit 205 transfers the visible toner image onto a transfer paper fed from the paper feeding unit 204. Thereafter, the toner image on the transfer paper is heated and pressed by the fixing unit 206, and is fixed on the transfer paper. Residual toner after the transfer is removed by the cleaning unit 207, and it is further de-electrified by the de-electrifier, after which a next image forming cycle takes place.

Figure 3:
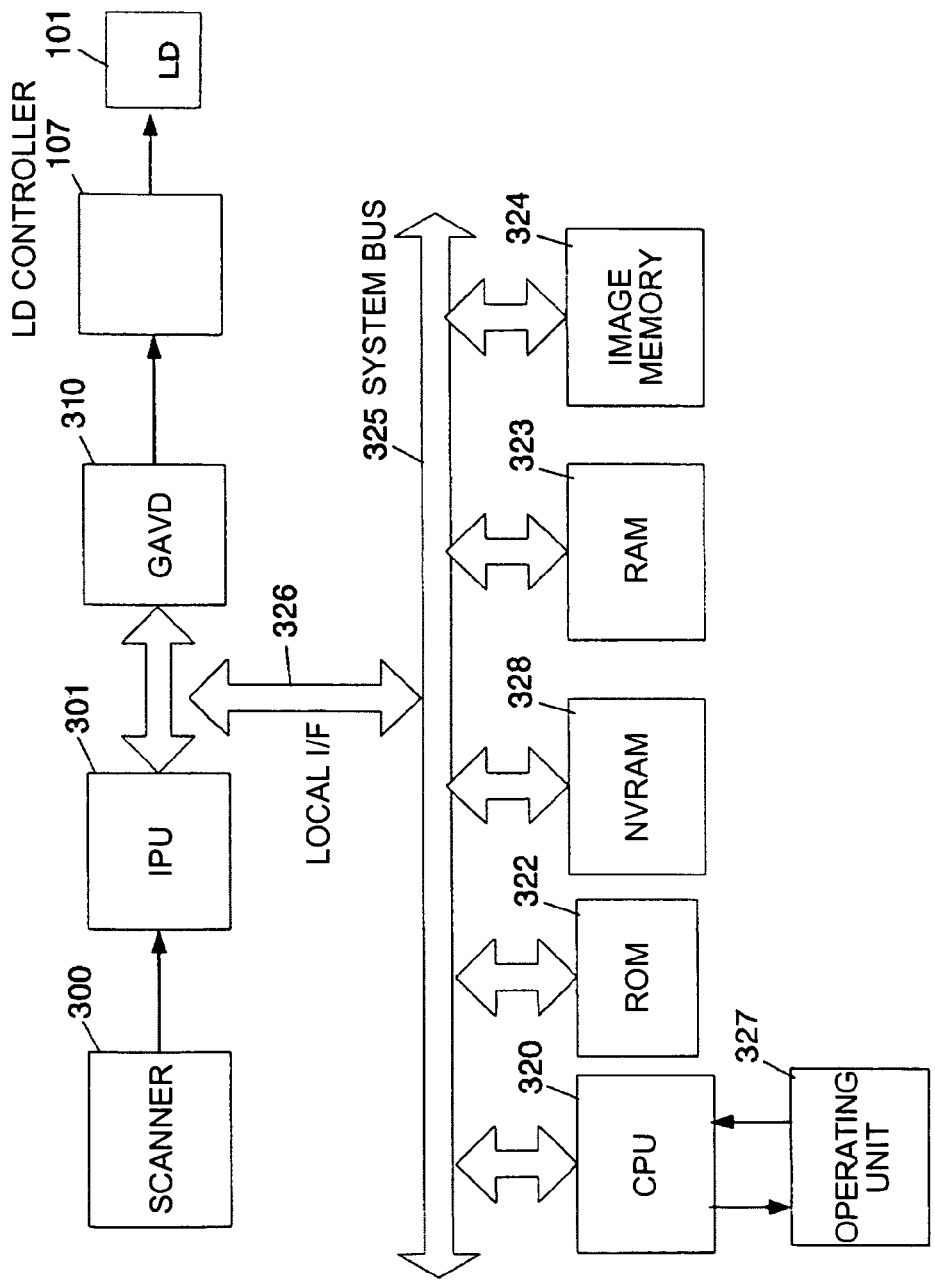
FIG. 3 is a block diagram of the image forming apparatus according to the embodiment.

FIG. 3 is a block diagram of the image forming apparatus according to the embodiment. The image forming apparatus according to the embodiment performs analog-to-digital (A/D) conversion of a read signal of an original image scanned by a scanner 300, and performs black offset correction, shading correction, and pixel position correction. The image forming apparatus includes an image processing unit (IPU) 301 that performs image processing, a generic audio video distribution (GAVD) 310 that controls a printer unit, the LD controller 107 that controls the LD 101, the LD 101 that writes electrostatic latent image data on the photoconductor 200, a central processing unit (CPU) 320 that performs the general control of the apparatus, a read only memory (ROM) 322 where a control program is stored, a random access memory (RAM) 323 that is temporarily used by the control program, a non-volatile random access memory (NVRAM) 328 that retains data even when powered off, an image memory 324 that stores a scanned image, an internal system bus 325 that ensures data exchange among the individual components, a local interface (I/F) 326 that interfaces between the internal system bus 325 and the IPU 301, and an operating unit 327 through which a user gives an instruction.

When an image scanned by the scanner 300 is output as an electrostatic latent image to the photoconductor 200, the CPU 320 performs sub-scanning position control on paper, and sends a start signal to the GAVD 310. The GAVD 310 receives image data from the IPU 301 at the previous stage in response to the start signal, and the LD controller 107 turns on the LD 101 based on the image data. The GAVD 310 performs the functions of the dot-position deviation detector/controller 112, the pixel clock generator 111, the LD drive data generator 110, the LD controller 107, and the polygon controller 108 shown in FIG. 1.

Figure 4:
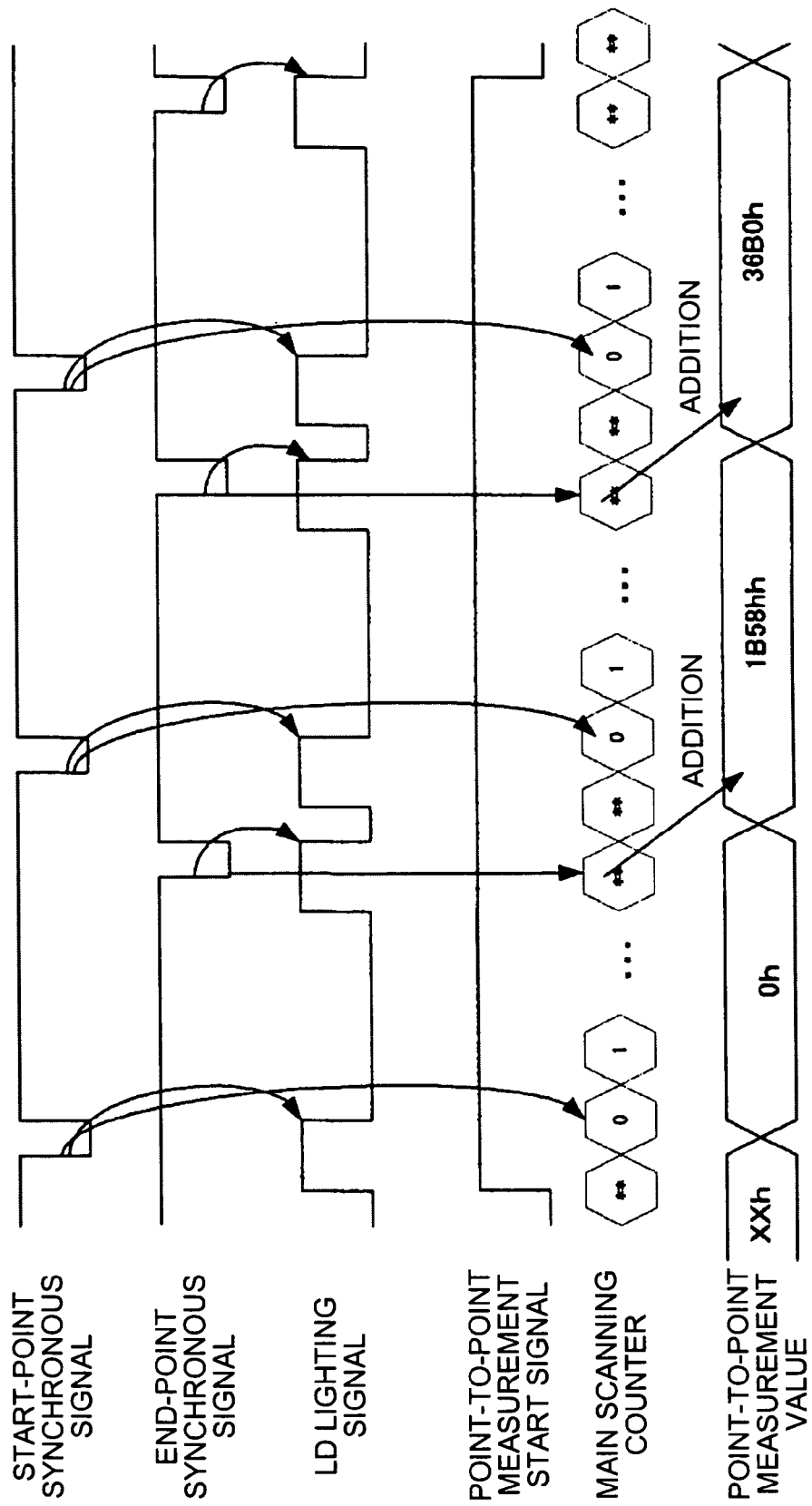
FIG. 4 is a timing chart for a point-to-point measurement in a dot-position deviation detector/controller.

FIG. 4 is a timing chart of a point-to-point measurement of the dot-position deviation detector/controller 112. An LD lighting signal is controlled by the LD drive data generator 110 of the GAVD 310. The LD lighting signal is asserted (high) at image light positions of the start-position synchronous detection plate 106a and the end-position synchronous detection plate 106b from 5 millimeters (mm). The LD lighting signal is negated (Low) at the falling of the synchronous signals. The falling of the start-position synchronous signal initializes a main scanning counter, which counts in response to the pixel clock, to "0". The end-position synchronous signal turns on the LD 101 5 mm before the trailing synchronization only when a point-to-point measurement start signal is asserted.

When the point-to-point measurement start signal is asserted (High), a point-to-point measurement value is initialized to "0" by the first start-position synchronous signal, and a main scanning count value is added to the point-to-point measurement value at the falling of the end-position synchronous signal.

While the time is measured in the unit of the pixel clock by a main scanning counter in the embodiment, the measurement can be also taken in the unit of 1/n of the pixel clock. The number of measurement can be set arbitrarily. The LD lighting signal is controlled by the LD drive data generator 110.

Figure 5:
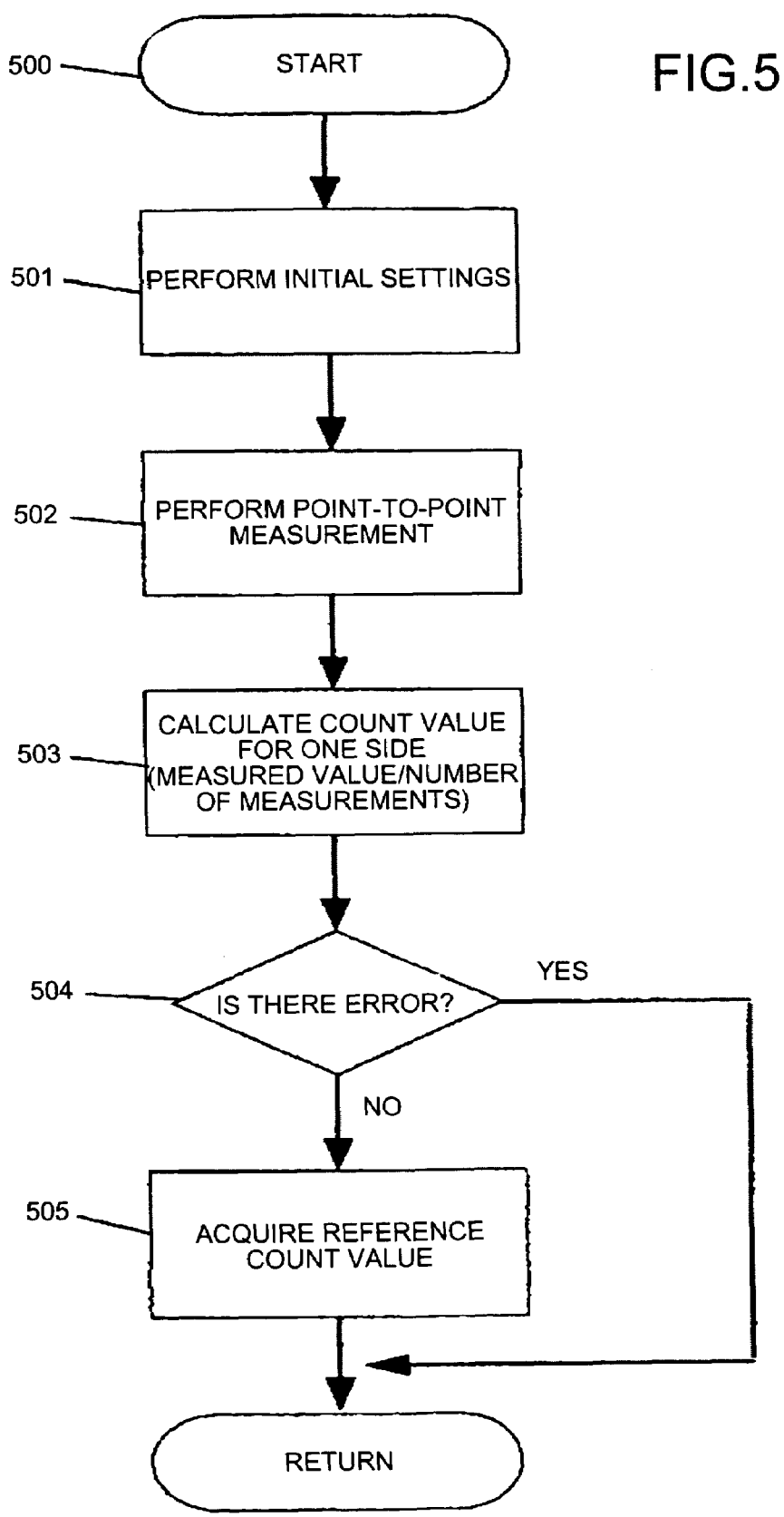
FIG. 5 is a flowchart of a reference-count-value acquiring process.

FIG. 5 is a flowchart of a reference-count-value acquiring process. In this process, polygon rotation, clock setting, and LD lighting are performed as the initial settings, and the start-position synchronous signal is detected at step 501. Point-to-point measurement starts at step 502. At step 503, a measured value N0 per one side of the polygon is calculated from "N0=measured value number of sides". At step 504, an error determination is made from A<N0<B. When there is an error, the operation returns to the start of the reference-count-value acquiring process at step 506. When there is no error, a measurement result N0 is acquired as a reference count value, and stored in the NVRAM 328 at step 505. The reference count value is acquired with the magnification optimally corrected to, for example, the value at the time of factory shipment. A and B in the equation are values preset for error determination.

The magnification correction in a main scanning direction is executed by changing the PLL frequency and the number of phase shifts in a way that the result of point-to-point measurement becomes equal to the reference count value.

Figure 6:
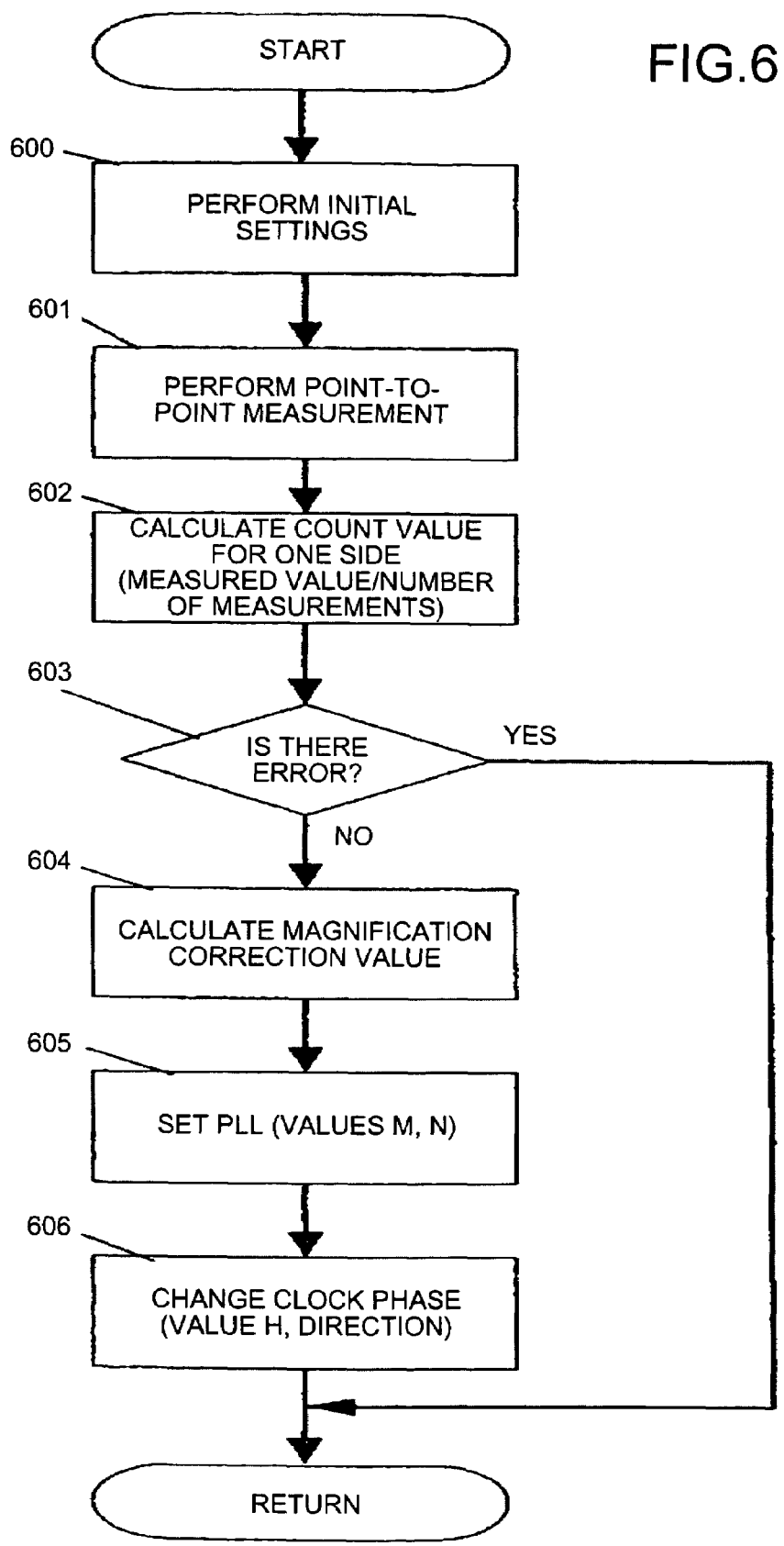
FIG. 6 is a flowchart of a magnification correcting process.

FIG. 6 is a flowchart of a magnification correcting process. In this process, the initial settings that have been explained with reference to FIG. 5 is performed first at step 600. Point-to-point measurement starts at step 601. At step 602, a measured value N per side of the polygon is calculated from "N=measured value number of sides". At next step 603, an error determination is made based on A<N<B. When there is an error, the operation returns to of the beginning of the magnification correcting process. When there is no error, a measurement result N is acquired, stored in the NVRAM 328, and a magnification correction value is calculated by software at step 604. Values M and N of the PLL are set from the correction value at step 605. A difference between a clock set by the PLL and an ideal pixel clock frequency is corrected to an optimal magnification by changing the clock phase at step 606.

At step 605, the ideal pixel clock frequency after magnification correction is calculated from V=N0/N×F, where N0 is a reference count value, N is a frequency counted at the pixel clock frequency F, F is a pixel clock frequency at which point-to-point measurement is performed when magnification correction is done, and V is an ideal pixel clock frequency after magnification correction. Accordingly, the values M and N of the PLL that provide a frequency closest to the ideal frequency V are acquired.

A difference between a frequency V' acquired from the values M and N and the ideal pixel clock frequency V is corrected next by the clock phase. The number of times, H, the clock phase is changed is calculated from the following equation. The clock phase is 1/16 of the pixel clock cycle, and the magnification is adjusted at the position of 297 mm in the effective image area. Given that D is the number of pixel clocks over 297 mm from the start-position synchronous detection plate 106a to the trailing position of paper, D=(E+297/2)×25.4/1200, where D is the number of pixel clocks over 297 mm from the start-position synchronous detection plate 106a to the trailing position of paper, and E is image light position of the synchronous detection plate.

The resolution is 1200 dots per inch (dpi).

A time difference G between the ideal pixel clock frequency V and the PLL frequency V' for D dots is G=(D×1/V)−(D×1/V'), and the number of changes H of the clock phase is H=G×1/V'/16 (decimal fraction being rounded off). The symbol indicates the direction, and the phase is shifted in a way that the cycle is lengthened when H is positive.

Figure 7:
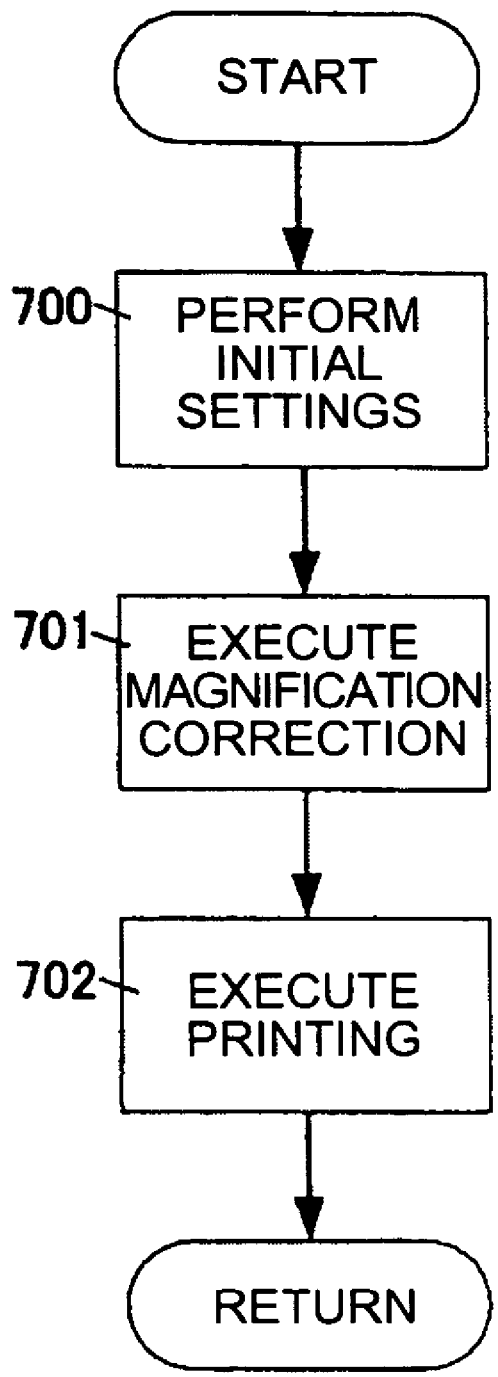
FIG. 7 is a flowchart of a process to be performed before a print job.

FIG. 7 is a flowchart of a process to be performed before a print job as an example of point-to-point measurement. In this process, the initial settings are performed (identical to the one at step 501 in FIG. 5) for printing is performed first at step 700. The magnification correction illustrated in the flowchart of FIG. 6 is executed at step 701, and printing is carried out at step 702.

FIG. 8 is a table of magnification correction values. In the setting table, M, N, and H are set for the pixel clock frequency changing by about 0.0035%. With the table provided, a frequency closest to the ideal pixel clock frequency V after magnification correction is selected from the setting table for correcting the magnification.

According to this embodiment, rough magnification correction is performed with the frequency of the PLL, and finer correction can be done at one or plural locations in the main scanning direction every 1/n of one pixel clock cycle. This makes it possible to provide a low-cost magnification correcting system with a small circuit scale and a high image quality.

According to the embodiments described above, it is possible to provide a low-cost optical beam scanning apparatus with a small circuit scale, and to execute magnification correction while suppressing image degradation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical beam scanning apparatus comprising:
   a light source configured to emit an optical beam;
   a control unit configured to control the light source to emit the optical beam according to image data;
   a deflecting unit configured to deflect the optical beam in a main scanning direction;
   a detecting unit configured to detect deflected optical beam on a main scanning line;
   a first correcting unit configured to correct a main scanning magnification; and
   a second correcting unit configured to correct the main scanning magnification, wherein, when an error is not detected in a count value based on a scanning time of the optical beam,
   the first correcting unit includes a clock generator configured to generate a lighting control clock for the light source based on the count value,
   the second correcting unit includes a clock-phase changing unit configured to change a phase of the lighting control clock by a unit of 1/n, where n is a positive integer equal to or larger than two, and
   the main scanning magnification is corrected by a combination of correction by the first correcting unit and correction by the second correcting unit.

2. The optical beam scanning apparatus according to claim 1, further comprising:
   a first beam-detecting unit configured to detect the deflected optical beam at a start position of scanning on the main scanning line;

a second beam-detecting unit configured to detect the deflected optical beam at an end position of scanning on the main scanning line;

a measuring unit configured to measure the scanning time of the optical beam based on timings at which the first beam-detecting unit and the second beam-detecting unit detect the optical beam; and a calculating unit configured to calculate an error in the main scanning magnification based on scanning time wherein the first correcting unit and the second correcting unit are configured to correct the main scanning magnification based on error.

3. The optical beam scanning apparatus according to claim 2, wherein the calculating unit is configured to calculate a correction value based on the scanning time, and the first correcting unit and the second correcting unit correct the main scanning magnification based on the correction value.

4. The optical beam scanning apparatus according to claim 3, further comprising:

a correction-value table configured to store a plurality of correction values, wherein the calculating unit is configured to select, from the correction-value table, a correction value having a closest value to calculated correction value.

5. The optical beam scanning apparatus according to claim 1, wherein the second correcting unit has a minimum correcting unit smaller than that of the first correcting unit.

6. The optical beam scanning apparatus according to claim 1, wherein the phase is changed at, at least one location.

7. An image forming apparatus comprising an optical beam scanning apparatus including a light source configured to emit an optical beam;

a control unit configured to control the light source to emit the optical beam according to image data;

a deflecting unit configured to deflect the optical beam in a main scanning direction;

a detecting unit configured to detect deflected optical beam on a main scanning line;

a first correcting unit configured to correct a main scanning magnification; and a second correcting unit configured to correct the main scanning magnification, wherein, when an error is not detected in a count value based on a scanning time of the optical beam, the first correcting unit includes a clock generator configured to generate a lighting control clock for the light source based on the count value, the second correcting unit includes a clock-phase changing unit configured to change a phase of the lighting control clock by a unit of 1/n, where n is a positive integer equal to or larger than two, and the main scanning magnification is corrected by a combination of correction by the first correcting unit and correction by the second correcting unit.

* * * * *